United States Patent [19]

Nishino et al.

[11] Patent Number: 5,418,620

[45] Date of Patent: May 23, 1995

[54] VIDEO SIGNALS RECORDER AND PLAYER INCLUDING INTERFRAME CALCULATING MEANS

[75] Inventors: Masakazu Nishino, Kashiwara; Shigeru Awamoto, Osaka; Toyohiko Matsuta, Katano, all of Japan

[73] Assignee: Matsushita Electric Industrial Co., Ltd., Osaka, Japan

[21] Appl. No.: 983,758

[22] Filed: Dec. 1, 1992

[30] Foreign Application Priority Data

Dec. 2, 1991 [JP] Japan .................................. 3-317845
Jan. 22, 1992 [JP] Japan .................................. 4-008979

[51] Int. Cl.$^6$ .................................................. H04N 5/76
[52] U.S. Cl. .................................. 358/335; 358/342
[58] Field of Search ............... 358/136, 133, 335, 342, 358/310; 360/32; 348/384, 394, 395, 397, 400, 401, 409, 412, 413, 415

[56] References Cited

U.S. PATENT DOCUMENTS 4,963,991 10/1990 Honjo ................................. 358/310
5,267,037 11/1993 Sugiyama ........................... 358/136

FOREIGN PATENT DOCUMENTS 366272 3/1991 Japan ............................ H04N 5/92

Primary Examiner—Tommy P. Chin
Assistant Examiner—Robert Chevalier
Attorney, Agent, or Firm—Wenderoth, Lind & Ponack

[57] ABSTRACT

When a standard TV signal of digital format is a first video signal and another digitized TV signal having a bandwidth wider than that of the first video signal is a second video signal, every two frames of the second video signal are calculated to produce a pixel value sum of the two frames and a pixel value difference between the same and either a resultant interframe calculated output or the first video signal is compressed through two-dimensional orthogonal transformation for ease of storage.

21 Claims, 10 Drawing Sheets

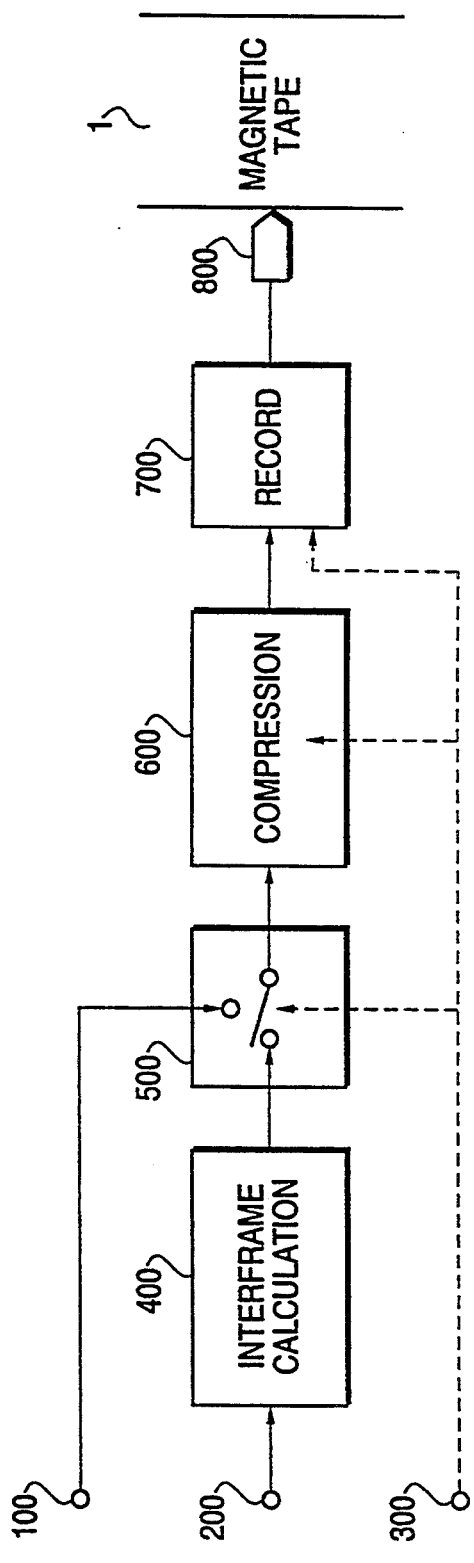
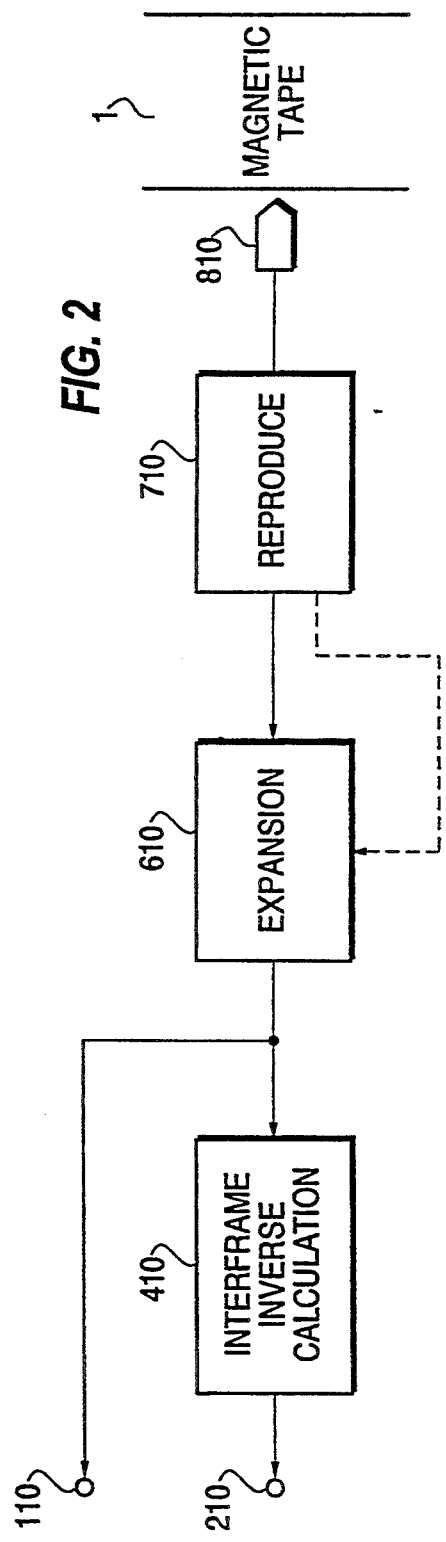

VIDEO SIGNALS RECORDER AND PLAYER INCLUDING INTERFRAME CALCULATING MEANS

BACKGROUND OF THE INVENTION

1. Field of the Invention

The present invention relates to a record/playback apparatus for recording and reproducing digitized and data compressed video signals having different in frequency bandwidths including a standard 4:3 aspect ratio TV signal, a 16:9 wide-screen TV signal, and a high-definition TV signal.

2. Description of the Prior Art

For improvement of recording and transmitting efficiency of a video signal which carries a large amount of data, high-efficiency encoding techniques are used to decimate the data amount without sacrificing image quality in reproduction. One such technique is orthogonal transform encoding in which a video signal is divided into blocks and the data of each block is encoded by frequency division. In particular, the data decimation is executed by reducing data at a high frequency range which carries image data less noticeable with the visual perceptivity of human eyes. The orthogonal transformation is commonly conducted by discrete cosine transforming non-interlaced data of each frame of the video signal.

As is understood, the input video signal to be processed is not one specific signal but a variety of different bandwidth signals including a standard TV signal for the 4:3 aspect ratio, a 16:9 wide-screen TV signal, and a high-definition TV signal having a wider bandwidth. For reproduction of such a discrete bandwidth width accuracy, each TV signal has to be sampled at a particular frequency for digitization. For digitizing the wider bandwidth of a TV signal, a high rate of the sampling frequency is needed and the amount of total data cannot be small. If the different TV signals are high efficiency encoded at one compression rate, the encoded or recording data of a wider bandwidth signal will be increased proportionally. If the recording data of each TV signal is uniform, the wider bandwidth signal will be more decimated producing an image of less quality.

For overcoming the drawbacks in processing a wider bandwidth video signal, there is provided a method of compressing interframe difference data of the video signal for eliminating redundancy in the timebase direction in addition to an interframe compression coding in which the video signal is spatially compressed. However, the interframe compression coding requires an extra local decoder circuit in its encoding circuit which is thus increased in overall size.

SUMMARY OF THE INVENTION

It is an object of the present invention to provide a record/playback apparatus capable of recording and reproducing a variety of video signals including a standard 4:3 aspect ratio signal, a 16:9 wide-screen signal, and a high-definition TV signal without increasing the recording data of a particular wide bandwidth signal, enlarging the overall circuitry arrangement, and lowering the quality of a reproduced image.

For achievement of the foregoing object, the present invention provides a video signal recording apparatus for selectively recording a first video signal which is a standard TV signal of digital format and a second video signal which is a digitized TV signal having a greater bandwidth than that of the first video signal comprising: an interframe processing means for calculating every two frames of the second video signal to produce a set of a sum frame based on a pixel value sum of the two frames and a difference frame based on a pixel value difference between the two frames; a compressing means for compressing the output of the interframe calculating means or the first video signal through two-dimensional orthogonal transformation in each frame; and a recording means for recording the output of the compressing means onto a recording medium. Also, a video signal playback apparatus according to the present invention comprises: a reproducing means for reproducing a data recorded on the recording medium by the foregoing video signal recording apparatus to a playback signal; an intraframe expanding means for converting the playback signal to a video signal of frame data through reverse of the two-dimensional orthogonal transformation; and an interframe inverse calculating means for calculating every two frames of the output signal of the intraframe expanding means to produce a set of a sum frame based on a pixel value sum of the two frames and a difference frame based on a pixel value difference between the two frames, in which when the recorded signal is the first video signal, the output of the intraframe expanding means is delivered as an output signal of the apparatus and when the recorded signal is the second video signal, the output of the interframe inverse calculating means is released as an output signal of the apparatus.

Another video signal recording apparatus according to the present invention comprises: an image dividing means for dividing each picture frame of the second video signal into n segments (n is a positive integer) ranging from the first segment data to the n-th segment data; an n number, first to n-th, of interframe calculating means for calculating every two frames of each segment data of the second video signal to produce a set of a sum frame based on a pixel value sum of the two frames and a difference frame based on a pixel value difference between the two frames; a first compressing means for compressing the output of the first interframe calculating means or the first video signal through two-dimensional orthogonal transformation in each frame; an (n−1) number, second to n-th, of compressing means for compressing the (n−1) outputs of the second to n-th interframe calculating means respectively through two-dimensional orthogonal transformation in each frame; and an n number, first to n-th, of recording means for recording the n outputs of the first to n-th compressing means respectively onto a recording medium. Also, a playback video signal apparatus for reproducing the data recorded by the above video signal recording apparatus comprises: an n number, first to n-th, of reproducing means for reproducing a recoded data on the recording medium to n playback signals; an n number, first to n-th, of intraframe expanding means for converting the playback signals to n video signals of frame data respectively through reverse of the two-dimensional orthogonal transformation; an n number, first to n-th, of interframe inverse calculating means for calculating every two frames of the output signal of each intraframe expanding means to produce a set of a sum frame based on a pixel value sum of the two frames and a difference frame based on a pixel value difference between the two frames; and an image mixing means for combining frame by frame the n outputs of the first to n-th interframe inverse calculating means to a reconstruction of the second video signal, in which when the recorded signal is the first video signal, the output of the first intraframe expanding means is delivered as an output signal of the apparatus and when the recorded signal is the second video signal, the output of the image mixing means is released as an output signal of the apparatus.

A further video signal recording apparatus according to the present invention comprises: an image dividing means for dividing each picture frame of the second video signal into n segments (n is a positive integer) ranging from the first segment data to the n-th segment data; an n number, first to n-th, of interframe calculating means for calculating every two frames of each segment data of the second video signal to produce a set of a sum frame based on a pixel value sum of the two frames and a difference frame based on a pixel value difference between the two frames; a first compressing means for compressing the output of the first interframe calculating means or the first video signal through two-dimensional orthogonal transformation in each frame; an (n−1) number, second to n-th, of compressing means for compressing the (n−1) outputs of the second to n-th interframe calculating means respectively through two-dimensional orthogonal transformation in each frame; a composition/distribution means for receiving the n compressed outputs of the first to n-th compressing means and converting them into an m number (m is a positive integer) of recording signals; and an m number, first to m-th, of recording means for recording the m recording signals respectively onto a recording medium. A video signal playback apparatus for reproducing the data recorded by the above recording apparatus comprises: an m number, first to m-th, of reproducing means for reproducing m recoded data on the recording medium respectively to m playback signals; an inverse composition/distribution means for receiving the m playback signals and converting them into an n number of outputs of compressed form; an n number, first to n-th, of intraframe expanding means for converting the playback signals to n video signals of frame data respectively through reverse of the two-dimensional orthogonal transformation; an n number, first to n-th, of interframe inverse calculating means for calculating every two frames of the output signal of each intraframe expanding means to produce a set of a sum frame based on a pixel value sum of the two frames and a difference frame based on a pixel value difference between the two frames; and an image mixing means for combining frame by frame the n outputs of the first to n-th interframe inverse calculating means to a reconstruction of the second video signal, in which when the recorded signal is the first video signal, the output of the first intraframe expanding means is delivered as an output signal of the apparatus and when the recorded signal is the second video signal, the output of the image mixing means is released as an output signal of the apparatus.

BRIEF DESCRIPTION OF THE DRAWINGS

FIG. 1 is a block diagram of a video signal recording apparatus showing a first embodiment of the present invention;

FIG. 2 is a block diagram of a video signal playback apparatus showing a second embodiment of the present invention;

DESCRIPTION OF THE PREFERRED EMBODIMENTS

Figure 3:
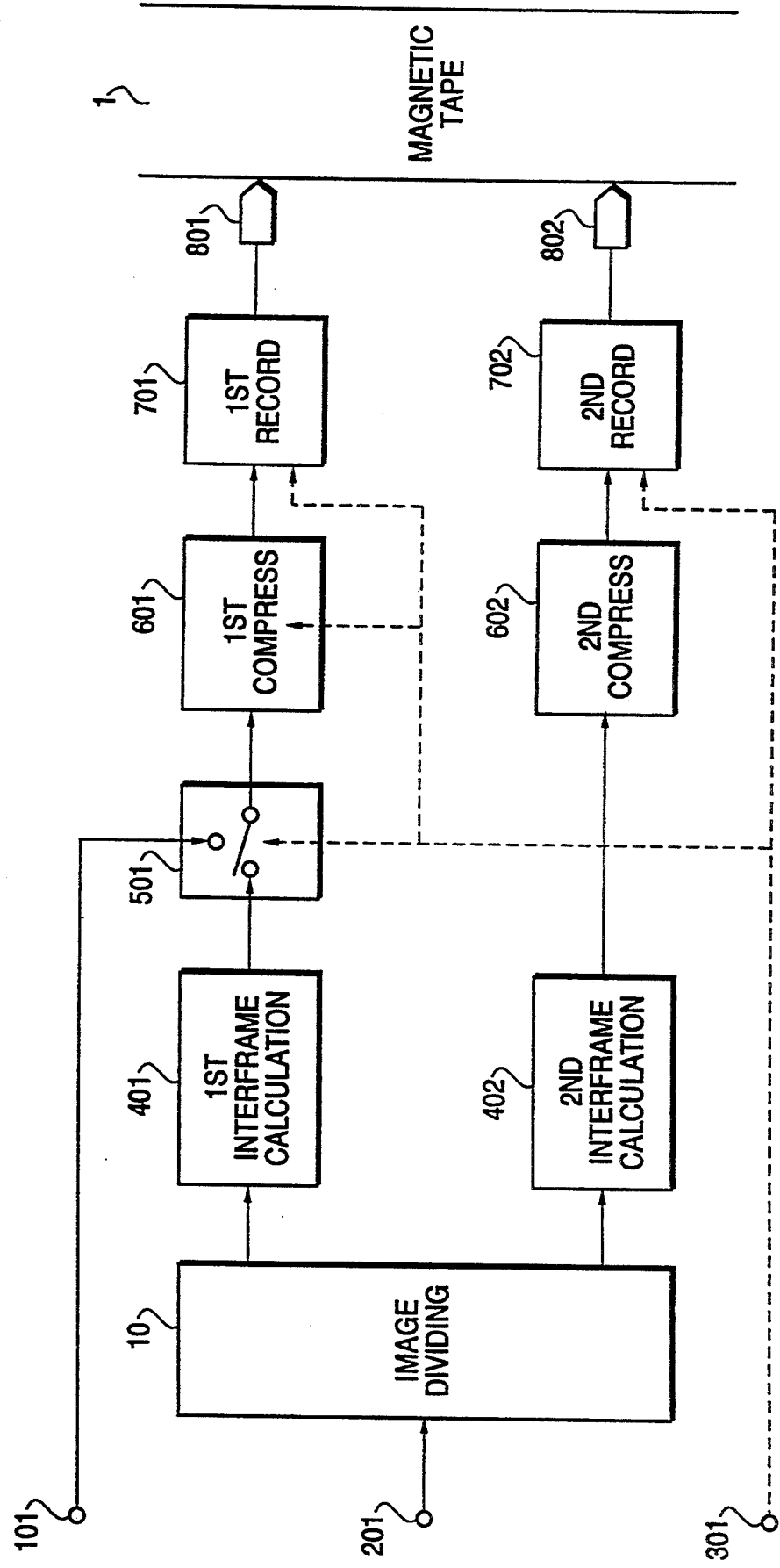
FIG. 3 is a block diagram of a video signal recording apparatus showing a third embodiment of the present invention.

FIG. 1 is a block diagram of a video signal recording apparatus showing a first embodiment of the present invention. As shown in FIG. 1, a standard TV signal of digital format is fed as a first video signal to a first input terminal 100 and another digitized TV signal which is greater in bandwidth than the first video signal is fed as a second video signal to a second input terminal 200. Also, a switch signal is fed to a third input terminal 300 for switching between the first and second video signals for selection of input. The second video signal is delivered to an interframe calculation circuit 400 where each two frames are processed to produce a data frame based on a sum of two frame pixel values and a data frame based on a difference between the two frame pixel values. A switch 500 is provided for selecting by switching action with the switch signal either the first video signal from the first input terminal 100 or the output of the interframe calculation circuit 400 for transmission to a compression circuit 600. The compression circuit 600 is also actuated by the switch signal to perform data compression of the first or second video signal at a pertinent rate. Also, a recording circuit 700 is provided for recording the output of the compression circuit 600 together with the switch signal from the third input terminal 300 onto a recording medium 1 by a recording head 800.

The action of the video signal recording apparatus of the first embodiment will now be described.

The first video signal is a 4:3 aspect ratio standard TV signal, also known as a 4:2:2 signal, in which a luminance component is sampled at 13.5 MHz and two chrominance components are sampled at 6.75 MHz. The second video signal produces a 16:9 widescreen image of which horizontal length is 4/3 of the standard 4:3 or first video signal. The second video signal has a wider bandwidth than of the first video signal and thus, its luminance component and two chrominance components are sampled at 18 MHz and 1 MHz respectively which are equal to 4/3 of 13.5 and 6.75 MHz. Hence, the second video signal carries a data amount 4/3 times greater than that of the first video signal.

The interframe calculation circuit 400 produces two, sum and difference, data frames through calculation of a sum of and a difference between the two pixel values of their respective frames of the second video signal. Each of the sum and difference frames has a number of pixels which is equal to the number of pixels of each of the two original frames.

The compression circuit 600 performs the interframe compression of the first or second video signal selectively through two-dimensional orthogonal transformation to a given amount of data, in which particularly, the second video signal carrying 4/3 times the number of pixels of the first video signal is compressed at a rate 4/3 times higher than that of the first video signal. The second video signal is step interframe calculated at a previous step by the interframe calculation circuit 400 to sets of a sum frame and a difference frame which can be compressed at a higher efficiency than the original form of the second video signal. Hence, if the second video signal represents a nearly still image, a difference between frames becomes close to zero regardless of the more or less amount of data in each frame and the data of a difference frame will be minimum after data compression. If the second video signal carries a sequence of data representing a motion image, the data of each difference frame will be greater than that of the still image difference frame while the data of each sum frame is relatively less due to a succession of movements. This is explained by the fact that human eyes tend to follow the action of an object in a motion image and in the respect of their visual abilities, reduction in the image definition will hardly be perceived. In the compression circuit 600, the compression rate is changed by the switch signal from the third input terminal 300 determining a target data amount per pixel after compression to provide a constant data amount for a given period of time.

The recording circuit 700 converts the data compressed signal from the compression circuit 600 to an error correction coded form which is then modulated to a recording signal for recording onto the magnetic tape 1. As the amount of data after the compression is identical between the first and second video signal, a series of the processing are the same regardless of a type of the input video signal. For identifying, during playback operation, whether the first or second video signal has been recorded, the switch signal is also recorded onto the tape 1.

As set forth above, the first embodiment of the present invention allows any input signal to be data compressed after shifting to sets of a sum frame and a difference frame. Accordingly, the second video signal which represents a large number of pixels than the first video signal can exhibit less deterioration of the image quality while having been compressed at a higher rate to a constant recording amount equal to that of the first video signal. Also, the compression circuit 600 is applicable to both the first and second video signals, contributing to the downsizing of the overall circuitry arrangement.

FIG. 2 is a block diagram of a video signal playback apparatus showing a second embodiment of the present invention. The playback apparatus of the second embodiment is provided for reproducing the first or second video signal recorded onto the magnetic tape 1 with the recording apparatus of the first embodiment. As shown in FIG. 2, the recorded signal stored in the magnetic tape 1 is retrieved by a playback head 810 to a reproducing circuit 710 where it is demodulated and error correction decoded to a video signal of data compressed form. At the time, the switch signal identifying whether the first or second video signal is also retrieved from the magnetic tape 1. The compressed video signal is then expanded to a video signal of the original number of pixels by means of two-dimensional orthogonal transformation of an expansion circuit 610 which is inverse to the operation of the compression circuit 600. When the recorded signal on the magnetic tape 1 is the first video signal of compressed form, the output of the expansion circuit 610 is directly delivered as a first video playback signal from a first output terminal 110. When the recorded signal is the second video signal of compressed form, it is fed to an interframe inverse calculation circuit 410 for inverse operation to that of the interframe calculation circuit 400 in which each set of a sum frame and a difference frame is converted back to two initial frames representing the original pixels. The output of the interframe inverse calculation circuit 410 is then delivered as a second video playback signal from a second output terminal 210.

As set forth above, the second embodiment of the present invention allows the expansion circuit 610 to be applicable to both the first and second video signals of compressed form, contributing to the downsizing of the overall circuitry arrangement. Also, the interframe inverse calculation circuit 410 produces two initial frames of the original pixels through calculation of a sum and a difference between the sum and difference frames which is equivalent to the operation of the interframe calculation circuit 400 and can thus share a substantial circuit with the interframe calculation circuit 400.

FIG. 3 is a block diagram of another video signal recording apparatus showing a third embodiment of the present invention. As shown in FIG. 3, a standard TV signal of digital format is fed as the first video signal to a first input terminal 101 while another digitized TV signal which has a wider bandwidth than the first video signal is fed as the second video signal to a second input terminal 201. In addition, a switch signal is fed to a third input terminal 301 for selection of an input signal to be recorded from the first and second video signals. The second video signal is transmitted to an image dividing circuit 10 where each frame of the second video signal is divided into n segments (n is an integer) and more particularly, into two segments (n=2) according to this embodiment. There are provided two, first and second, interframe calculation circuits 401,402 which are identical in the construction to the interframe calculation circuit 400 of the first embodiment. A switch 501 is actuated by the switch signal from the third input terminal 301 to select either the first video signal from the first input terminal 101 or the output of the first interframe calculation circuit 401 for transmission to a first compression circuit 601 at a succeeding step. The first compression circuit 601 is identical in the construction to the compression circuit 600 of the first embodiment in which the input video signal is data compressed at a pertinent rate. A second compression circuit 602 is also provided for data compression of the video output of the second interframe calculation circuit 402, in which the absence of the first video signal requires no use of the switch signal. A first recording circuit 701 for recording a video output of the first compression circuit 601 onto a recording tape 1 by a recording head 801 is identical in the construction to the recording circuit 700 of the first embodiment. Also, a second recording circuit 702 for recording an video output of the second compression circuit 602 by a recording head 802 onto the recording tape 1 is arranged for canceling the transmission of a recording signal to the recording head 802 when the switch signal from the third input terminal 301 instructs the input of the first video signal. Accordingly, while the second video signal is recorded with the two recording heads 801,802, the first video signal is recorded with only the recording head 801 to the magnetic tape 1. The data rate during recording the second video signal is twice as high as that of the first video signal.

The first video signal fed to the first input terminal 101 is a standard TV signal (4:2:2) for the 4:3 aspect ratio and the second video signal fed to the second input terminal 201 is a high-definition TV signal for 16:9 aspect ratio which is 4/3 times longer in the horizontal screen length and two times greater in the number of scanning lines than the first video signal. More specifically, the high-definition TV signal carries two times more data than the wide-screen TV signal of the first embodiment.

Figure 4:
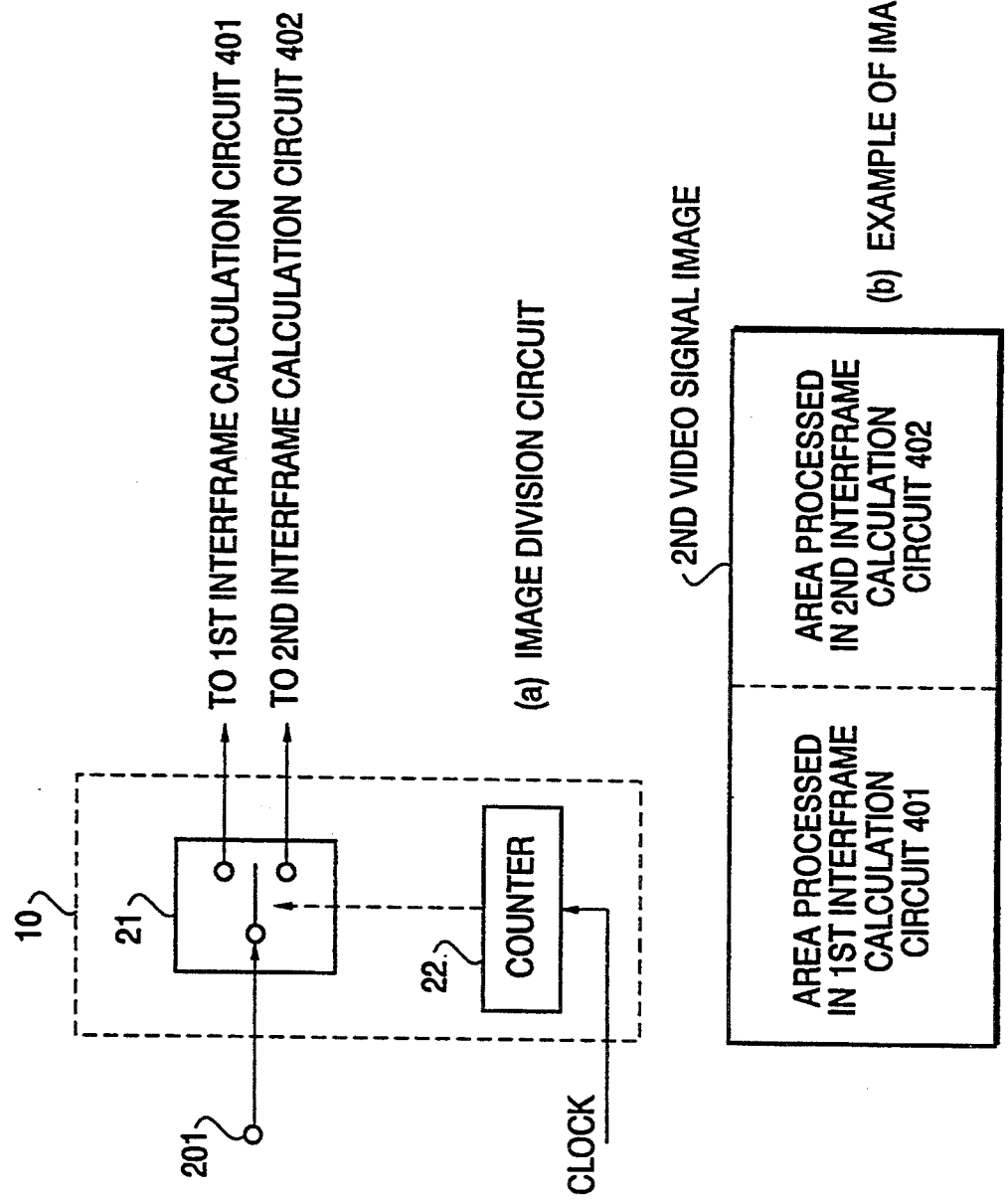
FIG. 4 illustrates a block diagram of an image dividing circuit according to the present invention and an example of image dividing.

The image dividing circuit 10 divides each frame of the second video signal into two segments thus producing two segment signals. Each of the two segment signals represents the same number of pixels as of the wide-screen TV signal of the first embodiment. Hence, the segment signal from the image dividing circuit 10 can be processed in the same manner as the two-line parallel processing of the first embodiment and more specifically, the second video or high-definition TV signal can be data compressed by like procedures. At the time, the compression rate is equal to that for the wide-screen TV signal and thus, the recording rate for recording the second video signal onto the magnetic tape 1 is two times higher than that of the first embodiment. FIG. 4 illustrates an arrangement of the image dividing circuit 10, in which FIG. 4-a is a block diagram of the same. As shown, the image dividing circuit 10 comprises a switch 21 and a counter 22. In operation, the counter 22 supplies a switch signal at intervals of a predetermined number of clocks to the switch 21 which in turn transmits the second video signal from the second input terminal 201 selectively to the first and second interframe calculation circuits 401,402. The number of clocks is arbitrarily determined since the switching action of the switch 21 is controlled by the counter 22. FIG. 4-b shows an example of the switching in which a frame image of the second video signal is divided into two, left and right, halves, the left half being processed by the first interframe calculation circuit 401 and the right half being processed by the second interframe calculation circuit 402.

As set forth above, in the third embodiment of the present invention, a circuit is provided for processing the first video or standard TV signal to be utilized for processing and recording the high-definition Tv signal which carries more than two times the data of the standard TV signal. The video signal recording apparatus of the third embodiment designed for compressing and recording a high-definition signal can record also a standard TV signal through data compression for each frame without the use of a specific circuit.

Figure 5:
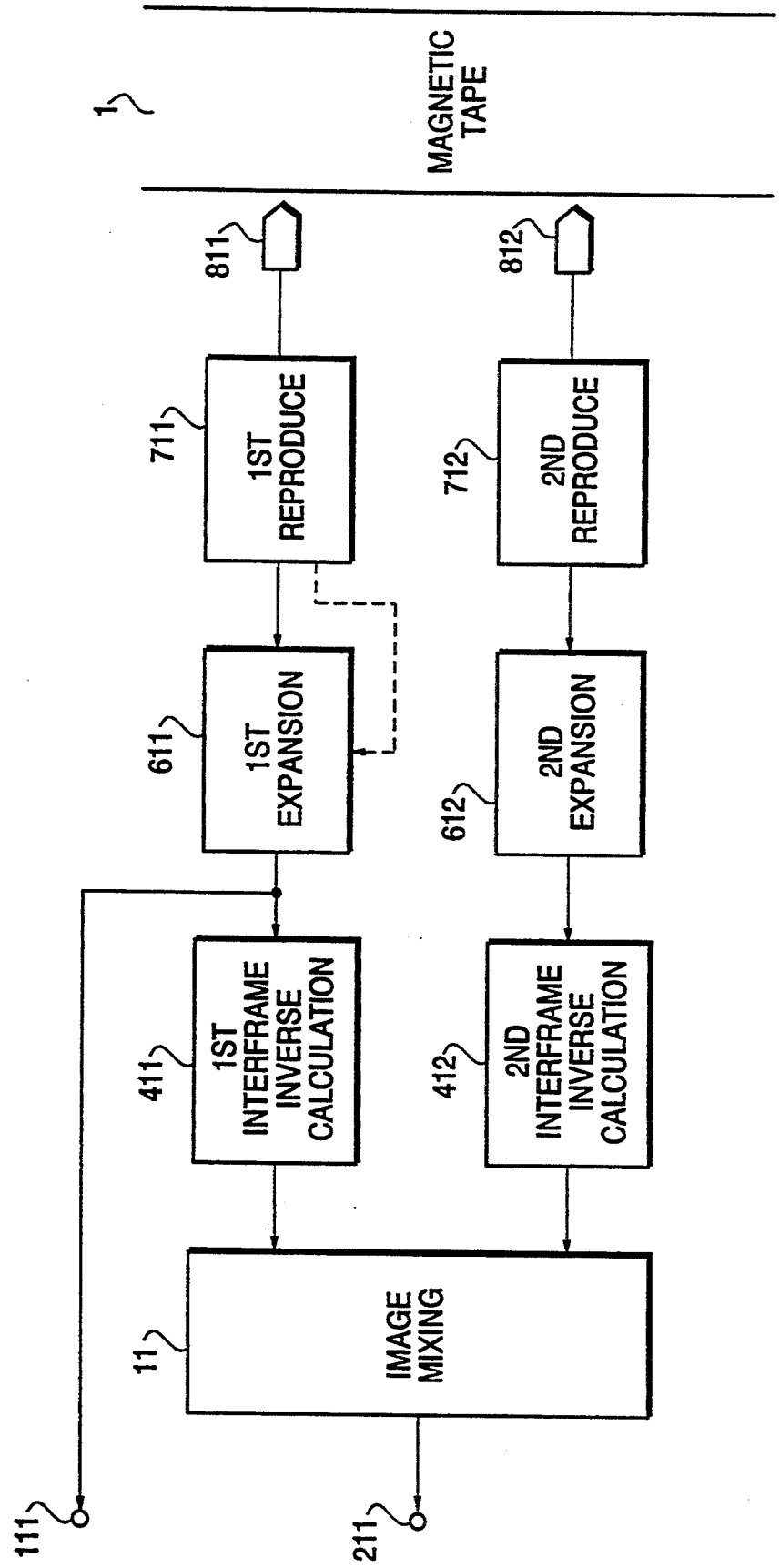
FIG. 5 is a block diagram of a video signal playback apparatus showing a fourth embodiment of the present invention.

FIG. 5 is a block diagram of another video signal playback apparatus showing a fourth embodiment of the present invention, in which the signal recorded onto the magnetic tape 1 according to the third embodiment (the image dividing of the image dividing circuit 10 was conducted at n=2) is reproduced to its original high-definition or standard TV format.

As shown in FIG. 5, the two different signals recorded by the first and second recording circuits 701,702 of the third embodiment are retrieved by two playback heads 811,812 respectively and fed to a first reproducing circuit 711 and a second reproducing circuit 712 where they are demodulated and error correction decoded to two segment signals of compressed form. The compressed signals are then transmitted to a first expansion circuit 611 and a second expansion circuit 612 for data expansion through two-dimensional orthogonal transformation which is inverse to the operation of the first and second compression circuits 401,402 of the third embodiment. If the recorded signal on the magnetic tape 1 is a standard TV signal, the output of the first expansion circuit 611 is directly delivered as the first video signal from an output terminal 111. If the recorded signal is a high-definition TV signal, the first and second expansion circuits 611,612 deliver reproduced data based on a set of a sum frame and a difference frame which are then converted back by a first interframe inverse calculation circuit 411 and a second interframe inverse calculation circuit 412 to initial frame data. An image mixing circuit 11 performs an inverse of the operation of the image dividing circuit 10 of the third embodiment, in which two segment signals of the frame data from the first and second interframe inverse calculation circuits 411,412 are combined to an original high-definition TV signal (or the second video signal) which is then transmitted to a second output terminal 211.

The fourth embodiment is adapted for performing an inverse operation of the video signal recording apparatus of the third embodiment. In particular, each of the first and second interframe inverse calculation circuits 411,412 converts back an input data based on a sum frame and a difference frame by summing and subtracting to two initial frames. Accordingly, the first and second interframe inverse calculation circuits 411,412 in the video signal playback apparatus can share substantial circuits with the first and second interframe calculation circuits 401,402 of the video signal recording apparatus of the third embodiment respectively.

Figure 6:
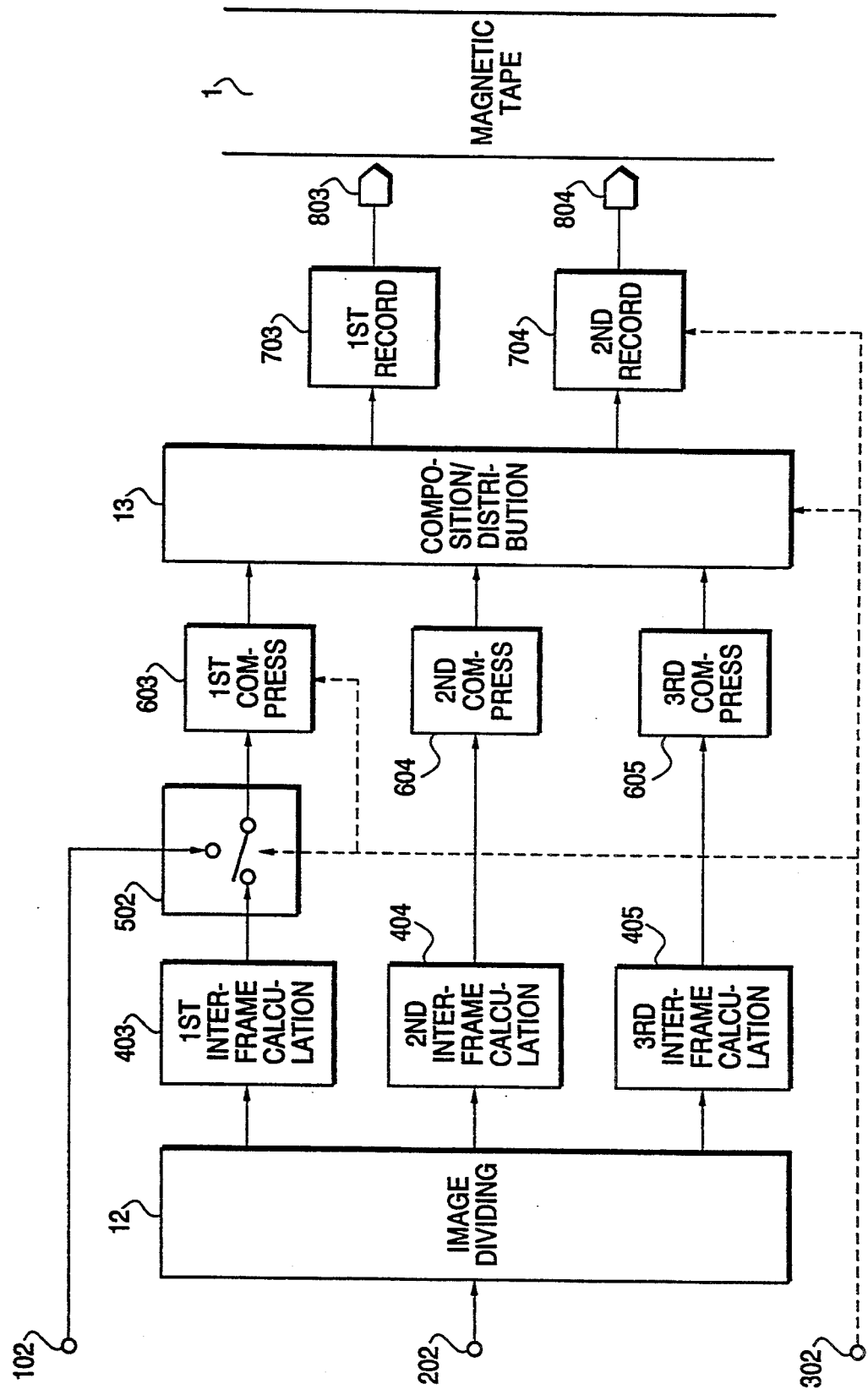
FIG. 6 is a block diagram of a video signal recording apparatus showing a fifth embodiment of the present invention.

A fifth embodiment of the present invention will now be described in the form of a video signal recording apparatus. FIG. 6 is a block diagram of the recording apparatus, in which a digitized standard TV signal (4:2:2) is fed as the first video signal to a first input terminal 102 and a digitized high-definition TV signal is fed as the second video signal to a second input terminal 202. The second video signal of high-definition TV format is sampled at a frequency which is three times greater than that for the first video signal and thus, carries three times the data of the first video signal. Also, a switch signal is fed to a third input terminal 302 for selecting an input signal from the two, first and second, video signals.

An image dividing circuit 12 is provided for dividing each frame of the second video signal into n segments or more specifically, into three segments (n=3) in the fifth embodiment. The data amount of each segment is equal to that of the first video signal. The image dividing circuit 12 is similar in the construction to the image dividing circuit 10 shown in FIG. 4, comprising a counter and a switch. The difference is that the switch 21 of the circuit 10 having two output lines is replaced with a switch having three output lines for three, left, right, and center, image segments of the frame data. The three segments are transmitted to a first 403, a second 404, and a third interframe calculation circuit 405 respectively for calculation to produce a set of a sum frame and a difference frame. There is a switch 502 for selecting either the first video signal from the first input terminal 102 or the output of the first interframe calculation circuit 403 for transmission to a first compression circuit 603. The three segment signals based on a set of a sum frame and a difference frame are fed to the first 603, a second 604, and a third compression circuit 605 respectively for data compression. If the video signal recording apparatus is in a particular mode for recording the first video signal (or standard TV signal), the first compression circuit 603 receives and compresses the first video signal from the first input terminal 102. As understood, the first video signal carries an equal number of pixels to those of each segment of the second video signal and thus, the first compression circuit 603 performs the same compressing action regardless of a type of the input signal. However, the segment data of the second video signal from the first interframe calculation circuit 403 represents sets of a sum frame and a difference frame and can be compressed at a higher efficiency than that for the first video signal. The data amount of a resultant compressed output from the first compression circuit 603 is thus smaller when the input is the segment of the second video signal than the first video signal.

Figure 7:
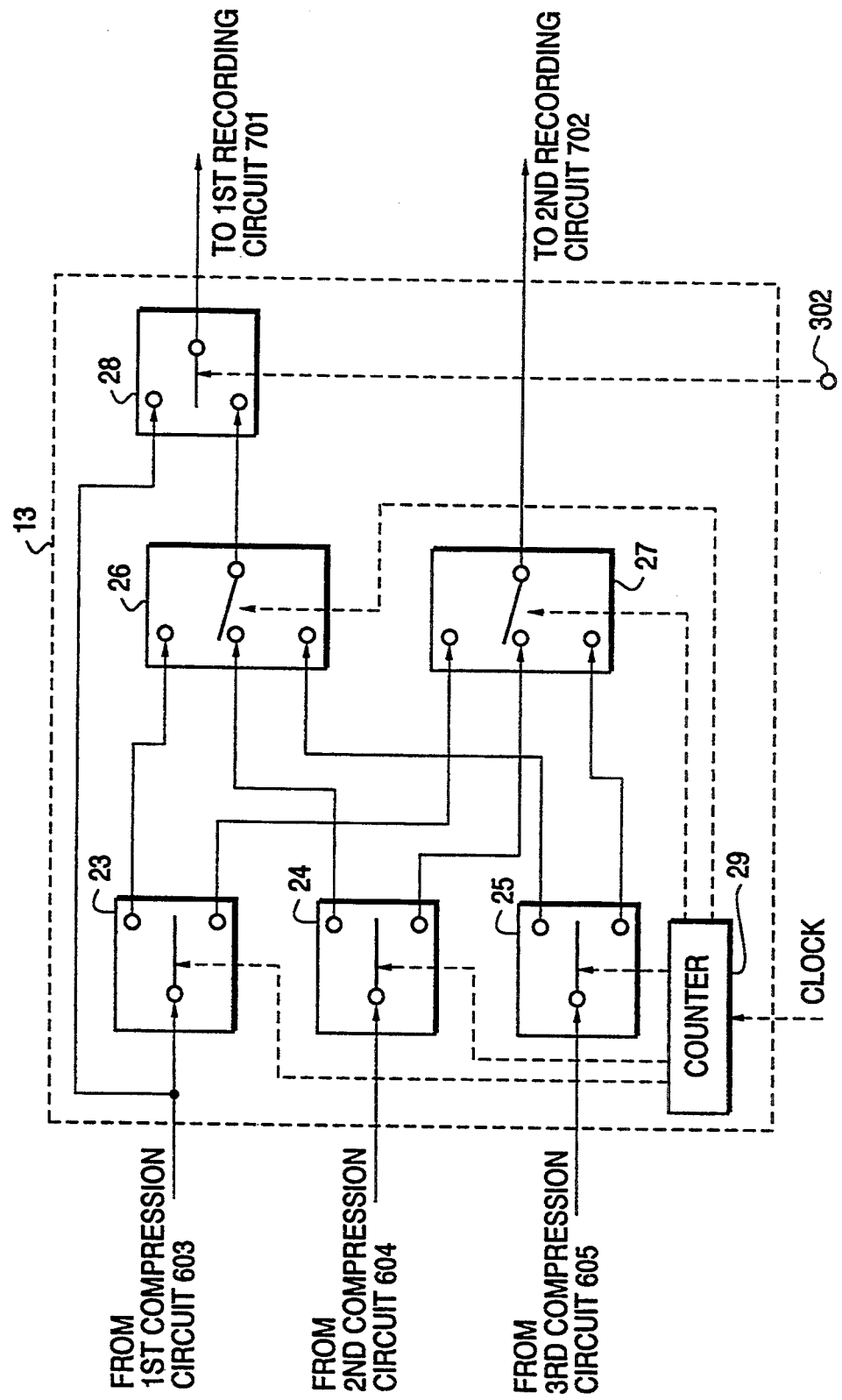
FIG. 7 is a block diagram of a composition/distribution circuit according to the present invention.

The three segment outputs of compressed form from the first, second, and third compression circuits 603,604,605 are then transmitted to a composition/distribution circuit 13 where they are combined together and delivered through m lines (m is a positive integer). In the fifth embodiment, m is 2 and two outputs are fed to a first recording circuit 703 and a second recording circuit 704 respectively. The two outputs are error correction encoded and modulated with their respective recording circuits 703,704 and sent to a couple of recording heads 803,804 respectively for recording onto a magnetic tape 1. If the input is the first video signal, the composition/distribution circuit 13 receives its compressed data from the first compression circuit 603 and transmits it directly to the first recording circuit 703. FIG. 7 shows an arrangement of the composition/distribution circuit 13. The three segment signals of compressed form from the first, second, and third compression circuits 603,604,605 are divided by two using three switches 23,24,25 respectively. Two subsegments of each segment signal are fed to two switches 26,27 respectively where one of the three subsegments is selected. The switching of the two switches 26,27 is controlled by operative clock signals from a counter 29. Also, provided is a switch 28 which is actuated by the switch signal from the third input terminal 302 to, when the input is the first video signal, select the compressed output of the first compression circuit 603 and when the input is the second video signal, the subsegment from the switch 26 for transmission further to the first recording circuit 701.

As set forth above, the fifth embodiment of the present invention allows a high-definition TV signal which carries three times the data of the standard TV signal to be divided into sum frames and difference frames and thus, compressed to a moderate recording size two times greater than that of the standard TV signal. The apparatus of this embodiment comprises three identical interframe calculation circuits, three identical intraframe compression circuits, and two identical recording circuits, in which one intraframe compression circuit and one recording circuit are arranged for co-use in processing the standard TV signal and a segment of the high-definition TV signal. Accordingly, both the standard and high-definition TV signals can be processed without the use of an extra circuit.

Figure 8:
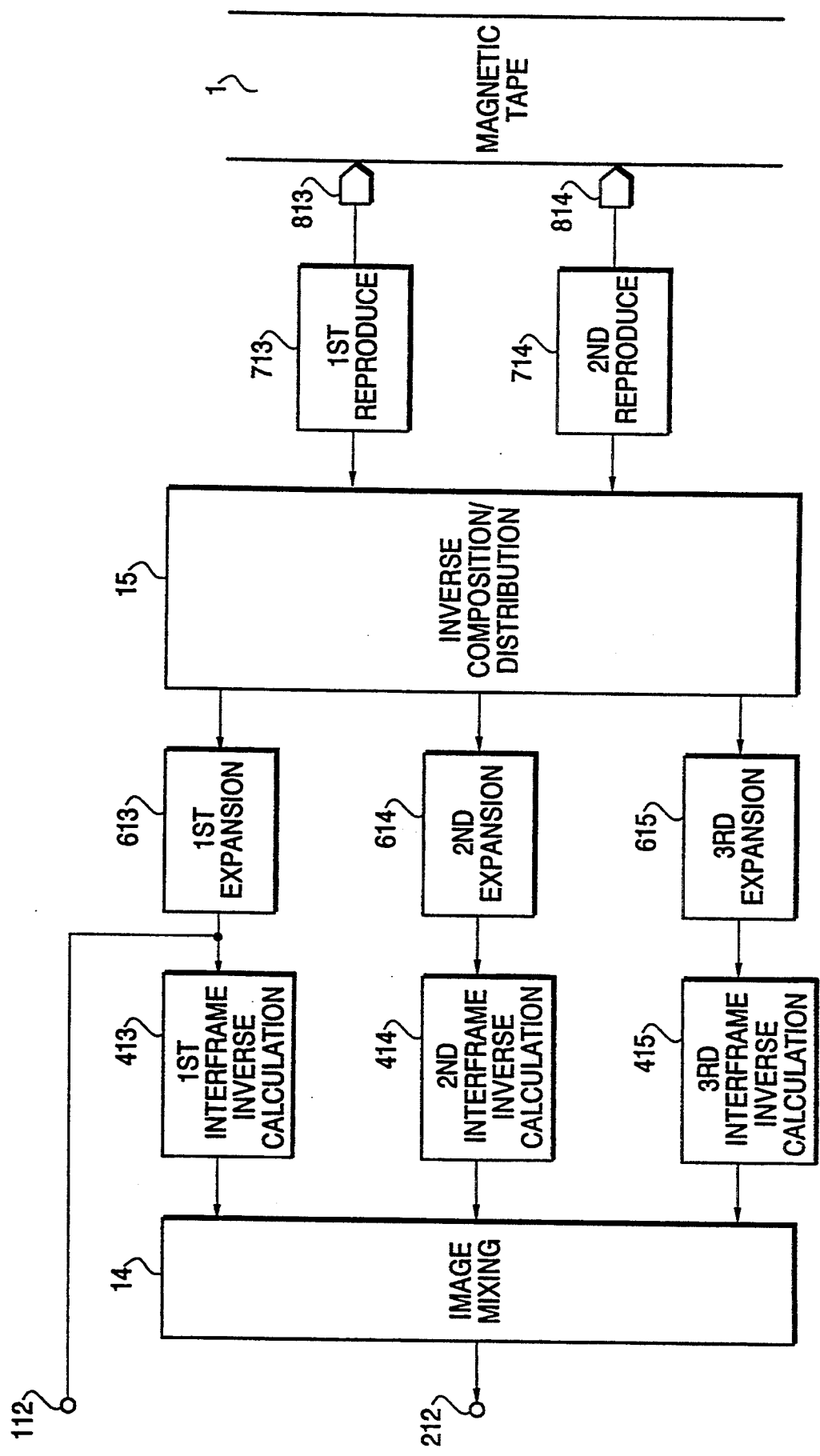
FIG. 8 is a block diagram of a video signal playback apparatus showing a sixth embodiment of the present invention.

FIG. 8 illustrates a further video signal playback apparatus according to a sixth embodiment of the present invention, in which the signal recorded by the video signal recording apparatus of the fifth embodiment (through division by n=3 with the image dividing circuit 12 and distribution in m=2 with the composition/distribution circuit 13) is reproduced to its original size.

As shown in FIG. 8, the recorded signal on the magnetic tape 1 is picked up by two playback heads 813,814 and transmitted to two reproducing circuits 713,714 for demodulation and error correction decoding. Two outputs from the reproducing circuits 713,714 are then fed to an inverse composition/distribution circuit 15 where they are processed inverse to the operation of the composition/distribution circuit 13 of the fifth embodiment in order to recover three compressed segments of the signal. The three compressed segments are then expanded by two-dimensional orthogonal transformation of a first expansion circuit 613, a second expansion circuit 614, and a third expansion circuit 615 respectively to their original data lengths. When the recorded signal is the second video signal, its expanded segments from the three expansion circuits 613,614,615 are sent to first, second, and third interframe inverse calculation circuits 413, 414, 415 respectively where each set of a sum frame and a difference frame of the input signal is converted back by summing and subtraction to two initial frames having the original number of pixels. Three frame data from the first, second, and third interframe inverse calculation circuits 413,414,415 are transmitted to an image mixing circuit 14 where they are combined together to reconstruct an original high-definition TV signal which is then delivered from a second output terminal 212.

When the recorded signal on the magnetic tape 1 is the first video or standard TV signal, an output of the first reproducing circuit 713 is only recovered and transmitted via the inverse composition/distribution circuit 15 to the first expansion circuit 613. The output from the first expansion circuit 613 is directly delivered as the first video playback signal through a first output terminal 112.

As set forth above, the sixth embodiment of the present invention is constituted by three identical interframe inverse calculation circuits, three identical intraframe expansion circuits, and two identical reproducing circuits, in which one intraframe expansion circuit and one reproducing circuit are arranged for co-use in processing the standard TV signal and a segment of the high-definition TV signal. Accordingly, both the standard and high-definition TV signals can equally be processed without the use of an extra circuit.

In the third and fourth embodiments, the second video signal of high-definition TV format may be replaced with a wide-screen TV signal similar to that of the first and second embodiments. The wide-screen TV signal can be processed with equal success by, in recording operation, directly transmitting from the second input terminal 201 across the image dividing circuit 10 to the first interframe calculation circuit 401 and in playback operation, delivering from the first interframe inverse calculation circuit 411 across the image mixing circuit 11 to the second output terminal 211 straightly. Also, the second video signal in the fifth and sixth embodiments may be of a wide-screen format which can successfully be recorded and reproduced through respective compression and expansion processings in the same arrangements.

Although the wide-screen TV signal in the relevant embodiments carries a data 4/3 times greater than that of the standard TV signal, it may be replaced with another format sampled at a higher frequency. Such a signal carrying more pixel values can equally be processed in the compression 600 and the expansion circuit 610 of the first and second embodiments respectively by using faster clock switching actions. A similar manner can be applied to the third and fourth embodiments. In the fifth and sixth embodiments, the wide-screen TV signal which carries as low as a half of the data of the high-definition TV signal can be processed at equal rates to those of the high-definition TV signal for the recording and playback operations respectively.

Although the number of scanning lines of the high-definition TV signal in the foregoing embodiments is two times greater than that of the standard TV signal, it may be more than two times. Also, intraframe compression and expansion circuits may be grouped into blocks depending on the number of scanning lines and horizontal pixels for optimum two-dimensional orthogonal transformation.

Although the high-definition TV signals are different in the sampling frequency between the third/fourth embodiments and the fifth/sixth embodiments, they may be identical. In any case, two recording signals processed in the video signal recording apparatuses of the third and fifth embodiments are equal in the storage form on magnetic tapes due to modification of the image dividing or proposition/distribution manner and can thus be reproduced by either of the video signal playback apparatuses of the fourth and sixth embodiments.

Arrangements of the interframe calculation circuit 400 and the compression circuit 600 will be explained referring to a block diagram of FIG. 9.

Figure 9:
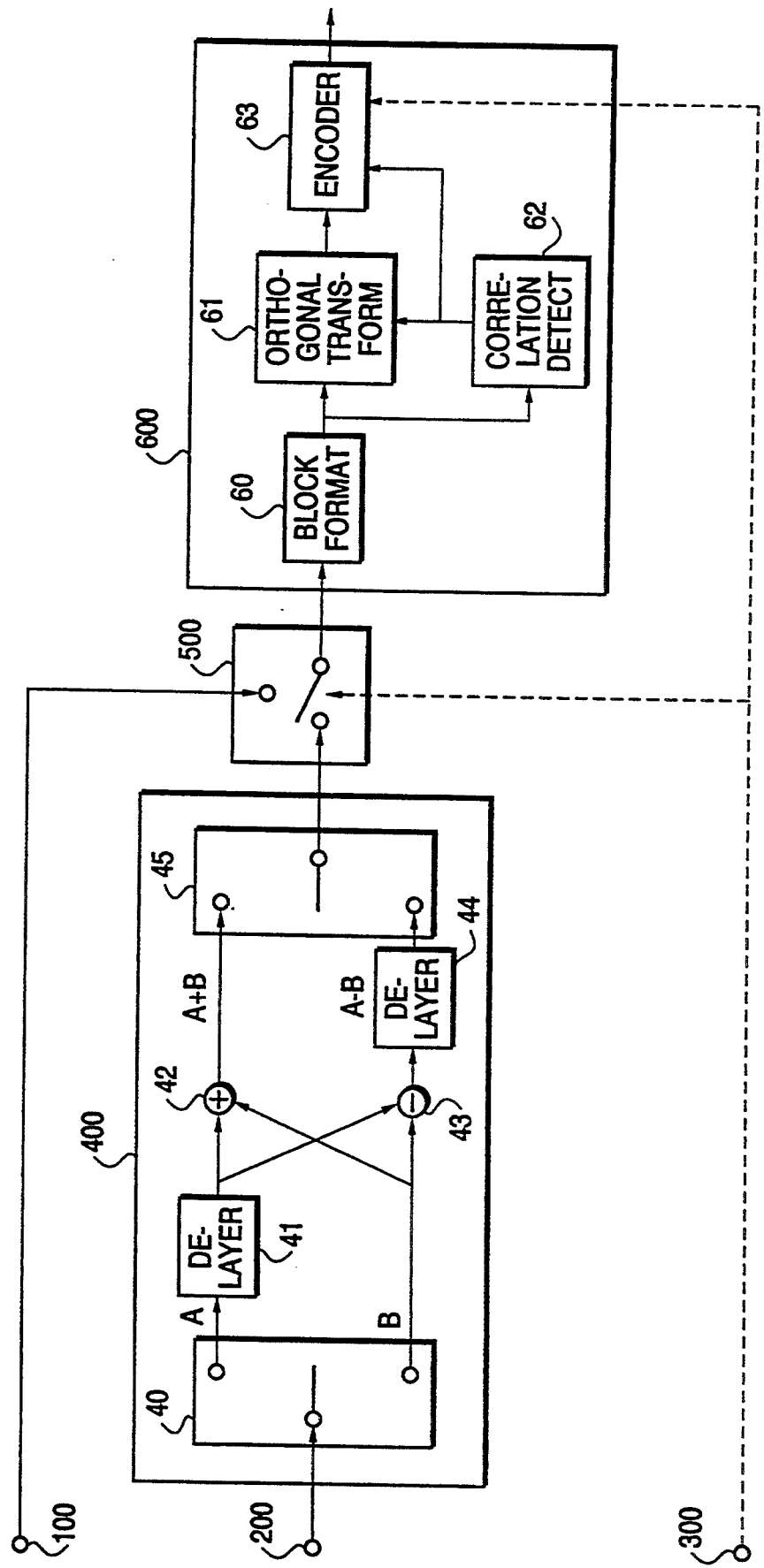
FIG. 9 is a block diagram showing an interframe calculation circuit and a compression circuit according to the present invention.

As shown in FIG. 9, the interframe calculation circuit 400 comprises a switch 40 for dividing each two frames of the second video signal into a first (A) and a second frame (B), a delayer 41 for delaying the first frame (A) by one frame period, an adder 42 for summing the first frame (A) of one frame delayed status and the second frame (B) to a sum frame (A+B), a subtractor 43 for subtracting the second frame (B) from the one-frame delayed first frame (A) to produce a difference frame (A−B), a delayer 44 for delaying the difference frame (A−B) by one frame period, and a switch 45 for transmitting the sum frame (A+B) and the difference frame (A−B) alternately in each frame period.

The compression circuit 600 comprises a block formatter 60, an orthogonal transformer 61, a correlation detector 62, and an encoder 63. The block formatter 60 divides each frame of the input signal supplied from the switch 50 into blocks, each block containing 64 pixels representing eight horizontal pixels by eight vertical pixels.

The orthogonal transformer 61 performs orthogonal transformation of each block data supplied from the block formatter 60. In particular, the orthogonal transformer 61 is controlled by an interfield correlation detect signal supplied from the correlation detector 62 to perform the intraframe orthogonal transformation of a still image data of the input signal when the interfield correlation is present and the intrafield orthogonal transformation of a motion image data when the same is less noticeable. Such an orthogonal transforming apparatus is disclosed in Japanese Patent Application No. 3-27284 by the applicant of the present invention (published on Sep. 22, 1992 with a laid-open No. 4-266284, and corresponding U.S. application Ser. No. 07/835,600 was filed on Feb. 14, 1992).

The encoder 63 performs quantization and conversion of orthogonal transformed data of each block to a variable length code which is transmitted as an orthogonal transformed code signal of compressed form to the recording circuit 700. In the encoder 63, the compressing rate is selectively shifted by the switch signal from the third input terminal 300 from the first video signal to the second video signal or vice versa to compress a discrete data amount per block to a given size.

The foregoing arrangements of the interframe calculation circuit 400 and the compression circuit 600 are applicable to those in the other embodiments of the present invention.

Figure 10:
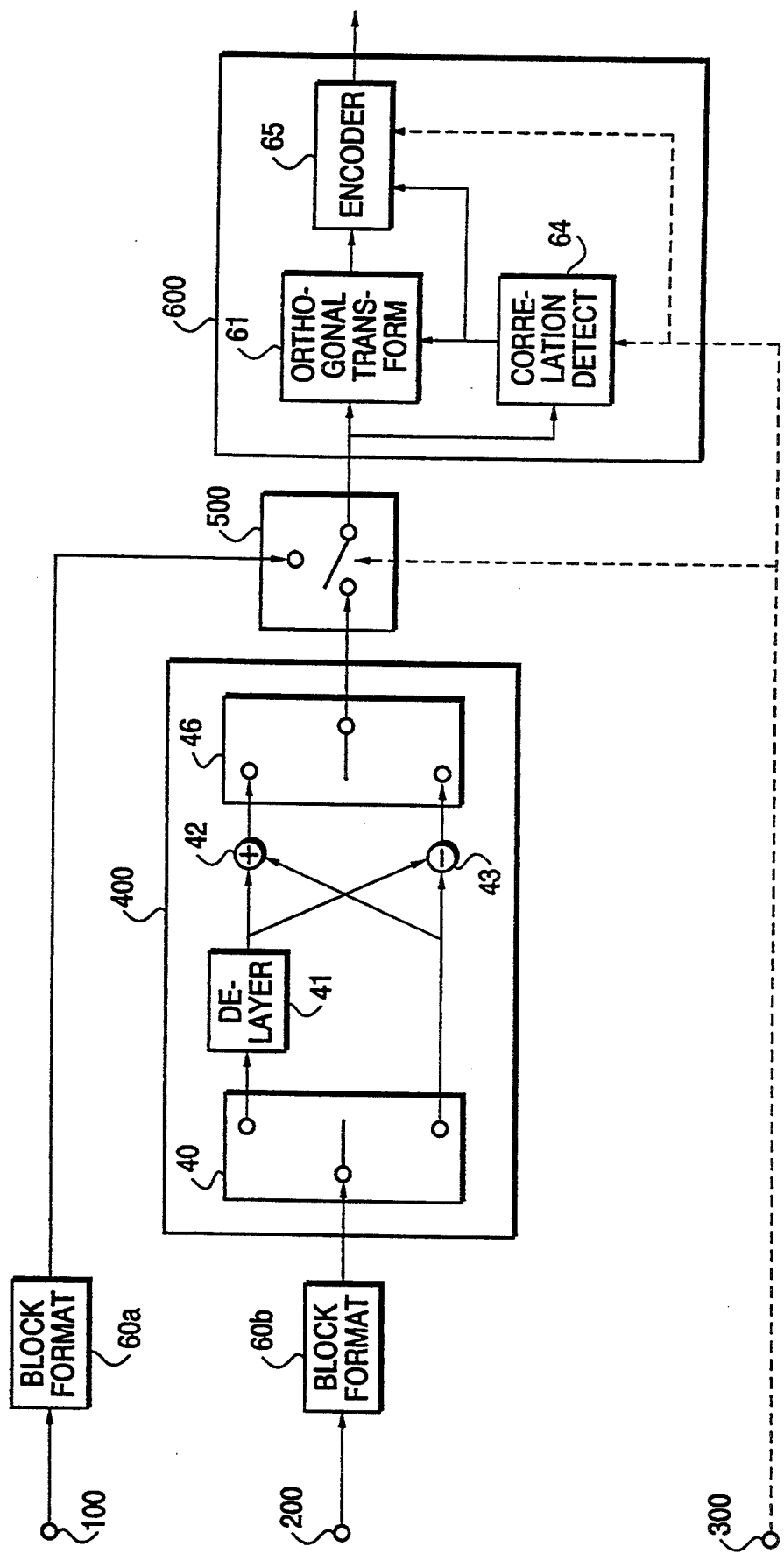
FIG. 10 is a block diagram showing another interframe calculation circuit and another compression circuit according to the present invention.

FIG. 10 shows another example of the cooperation of the interframe calculation circuit 400 and the compression circuit 600. The difference from FIG. 9 is that the block formatter 60 is replaced with two block formatters 60a, 60b arranged just after the first and second input terminals 100, 200 respectively. Also, while the delayer 44 of the interframe calculation circuit 400 for delaying the difference frame (A−B) is eliminated, a switch 46 instead of the switch 45 selects the sum frame and the difference frame alternately for each block to produce a chain of sum frame (A+B) 64-pixel blocks and difference frame (A−B) 64-pixel blocks aligned alternately which is then transmitted via the switch 500 to the compression circuit 600.

An orthogonal transformer 61 in the compression circuit 600 performs two-dimensional orthogonal transformation of each 64-pixel block without regard to the block being a sum or difference frame block. A correlation detector 64 detects not only interfield correlation but also interframe correlation from the difference block data when the input signal is the second video signal and sends a resultant correlation detect signal to the orthogonal transformer 61 for selection of the intraframe or intrafield orthogonal transformation.

The orthogonal transformed signal is then fed to an encoder 65 where a set of a sum block and a difference block of the signal (referred to as a medium block) is encoded, in which the sum block carries time-sequence low frequency data and the difference block carries time-sequence high frequency data. In the encoder 65, each medium block of the second video signal is quantized and converted to a variable length code which contains a given amount of data. The variable length code signal is then delivered as the orthogonal transformed code output of the apparatus of the embodiment.

The intraframe orthogonal transformation and intrafield orthogonal transformation of the second video signal will now be described in more detail.

The input signal to the orthogonal transformer 61 is a chain of the sum and difference blocks and may be inadequate to associate with the terms of intraframe and intrafield. However, both the sum block and the difference block result from calculation of frame data or more specifically, addition and subtraction of every two odd fields and of every two even fields. Hence, it is possible for explaining the action of the orthogonal transformer 61 that the resultant quantity of the odd or even interfield data calculation is designated as the field signal and also, either the sum block in which sum data between odd and even fields are non-interlaced or the difference block in which difference data between the same are non-interlaced is designated as the frame signal.

More particularly, when the first frame (A) of two initial frames is consisted of an odd field (A1) and an even field (A2) and the second frame (B) is consisted of an odd field (B1) and an even field (B2) not interlaced, the relation is expressed as:

$$A=[A1,A2]$$

$$B=[B1,B2] \qquad (1)$$

Then, the sum block (A+B) and the difference block (A−B) are expressed as:

$$A+B=[A1+B1,A2+B2]$$

$$A-B=[A1-B1,A2-B2] \qquad (2)$$

Accordingly, the frame signal is represented by [A1+B1,A2+B2] and [A1−B1,A2−B2] and the field signal is represented by A1+B1, A2+B2, A1−B1, and A2−B2.

The orthogonal transformer 61 performs two-dimenstional orthogonal transformation of each 8×8 block in intraframe orthogonal transformation assignment, and in intrafield assignment, two-dimensional orthogonal transformation of each 8×4 paxel field (comprising 8 horizontal pixels by 4 vertical pixels) of the frame signal of the block to produce a sum data and a difference data between the fields. As a direct current component of the interfield difference signal in two-dimensional orthogonal transformation is regarded as a time-sequence high frequency data, all the DC components in the block are represented by the DC component of the interfield sum signal so that the intrafield orthogonal transformed signal can be processed by the encoder 65 in the same manner as of the intraframe orthogonal transformed signal.

When the orthogonal transformed signals of the fields A1, A2, B1, and B2 produced through intrafield orthogonal transformation of the sum and difference blocks with the orthogonal transformer 61 are a1, a2, b1, and b2 respectively, their relations are expressed using the equations (2) by:

$$c1(\text{field})=a1+a2+b1+b2\text{: sum of sum block fields}$$

$$c2(\text{field})=a1-a2+b1-b2\text{: difference between sum block fields}$$

$$c3(\text{field})=a1+a2-b1-b2\text{: sum of difference block fields}$$

$$c4(\text{field})=a1-a2-b1+b2\text{: difference between difference block fields} \qquad (3)$$

Also, when the intraframe orthogonal transformed signals of the A and B frames are a and b respectively, the relations are expressed by:

$$c1(\text{frame})=a+b\text{: sum block}$$

$$c2(\text{frame})=a-b\text{: difference block} \qquad (4)$$

Figure 11B:
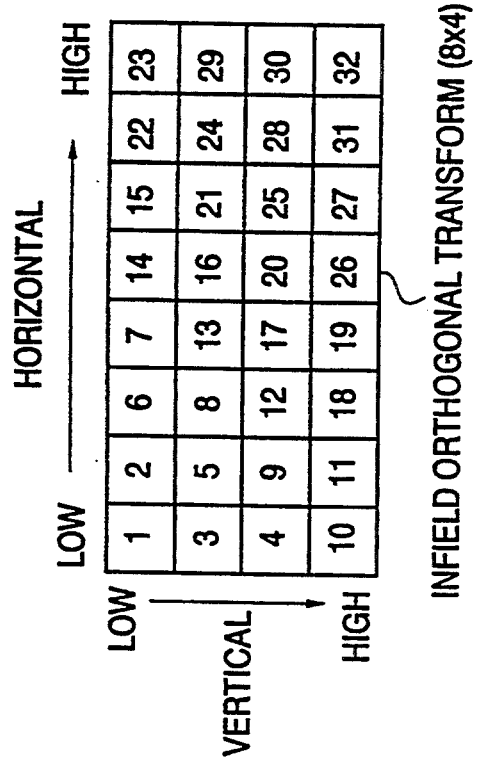
FIG. 11(a–b) is a diagram showing a transmission sequence of orthogonal transformed data according to the present invention.
Figure 11A:
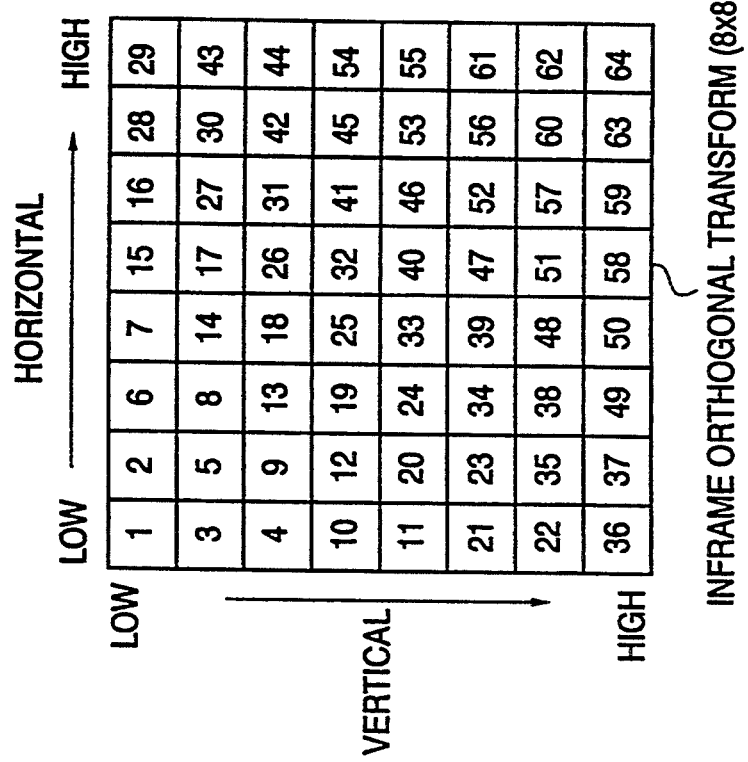

The medium block in the encoder 65 contains the orthogonal transformed data of (3) and (4) allocated in a spatial, time sequence from low range to high range, thus enabling a data compression similar to that of the first video signal. According to the spatial sequence, a series of orthogonal transform coefficients are arranged from low frequency range to high in a two-dimensional matrix of the intraframe or intrafield orthogonal transform processing. An example of the arrangement is illustrated in FIG. 11. In the time sequence, a row of the frames for intraframe orthogonal transformation is represented by d(frame) and a row of the fields for intrafield orthogonal transformation is denoted by d(field), which are:

$$d(\text{frame}): c1(\text{frame}) \rightarrow c2(\text{frame})$$

$$d(\text{field}): c1(\text{field}) \rightarrow c3(\text{field}) \rightarrow c4(\text{field}) \rightarrow c2(\text{field}) \qquad (5)$$

The d(frame) shows a sequence from a sum block to a difference block as explained with the relation (4) and its low component is a time average of the two frames. The d(field) indicates a time row of the four fields a1 → a2 → b1 → b2. As apparent from (3), each of c1(field), c2(field), c3(field), and c4(field) represents quartic Hamadard transformed quantities to the intrafield orthogonal transformed data of four fields. The d(field) shows a sequence of the Hamadard transformed data from low range to high.

As described, a set (i.e. the medium block) of a sum block and a difference block carries only one DC component in either the intraframe or intrafield orthogonal transformation and also, the orthogonal transformed data are arranged in a spatial, time sequence from low range to high range, whereby the processing in the encoder 65 can be uniform. In addition, the data of two frames is allocated in each medium block of the encoder 65 and thus, can easily be controlled to a particular amount by a known feed-forward technique with no use of a local decoder, as compared with the traditional feedback data control method in which difference data between the two frames has to be processed after intraframe calculation is completed.

The correlation detector 64 for producing a detection signal to instruct the switching between intraframe and intrafield orthogonal transforming operations in the orthogonal transformer 61 and the sequence of orthogonal transformed data in the medium block in the encoder 63, is designed to detect a correlation from measuring the amplitude of each data signal in the difference block as employs the easiest and most effective detecting manner. The difference block represents a frame difference signal and if the amplitude of its component data is small, will carry a still image mode having less motion data. Simultaneously, as the intraframe orthogonal transformation is conducted causing the orthogonal transformed component in the difference block to be reduced to almost zero, a most part of the orthogonal transformed signal to be encoded by the encoder 65 holds only sum blocks thus exhibiting a high level of data reduction.

If the amplitude of the data components in the difference block is high, it carries a motion image mode indicating that the two adjoined frames contain a large number of motion data. More particularly, the medium block is considered to have motion data across the 4 fields of the frames and the intrafield orthogonal transformation is selected for appropriate data compression.

As set forth above, the Hadamard transformation of sum and difference data of each two initial frames or data of four fields according to the present invention allows unwanted quantized error to be dispersed evenly into the two data frames or the four fields without use of any local decoder during the encoding. As the result, the entire circuitry arrangement will be minimized and the quality of a reproduced image will be improved.

Although the correlation detector 64 of the embodiment detects a correlation between the frames through examining the output signal of the interframe calculation circuit 400, it may detect the same directly from the output of the subtractor 43 while the difference block only is involved in the detection. The still/motion image mode detection is not limited to the interframe correlation on the difference block or frame difference data. Detection of interfield correlation is also a good idea in which motion data can be detected from all the four fields of two initial frames with equal success.

What is claimed is:

1. A video signal recording apparatus for selectively recording a first video signal which is a standard TV signal of digital format and a second video signal which is a digitized TV signal having a greater bandwidth than that of the first video signal, comprising:
   an interframe calculating means for processing every two frames of the second video signal to produce a set having a sum frame and a difference frame, the sum frame based on a pixel value sum of the two frames and the difference frame based on a pixel value difference between the two frames;
   a compressing means for selectively compressing the set of the sum frame and the difference frame produced by the interframe calculating means or the first video signal through two-dimensional orthogonal transformation in each frame; and
   a recording means for recording an output of the compressing means onto a recording medium.

2. An apparatus according to claim 1, wherein a sampling frequency of the second video signal is 4/3 times greater than a sampling frequency of the first video signal.

3. An apparatus according to claim 1, wherein the interframe calculation means comprises a block format circuit for dividing each frame of the second video signal into blocks and an interframe calculation circuit for producing a sum block from interframe addition and a difference block from interframe subtraction, and wherein the compressing means comprises an orthogonal transform circuit for orthogonal transforming the sum and difference blocks and an encoding circuit for compressing the data of a plurality of medium blocks, each medium block being made up of one sum block and one difference block, to a given amount of code form.

4. An apparatus according to claim 3, wherein the orthogonal transform circuit performs either an intraframe or intrafield orthogonal transform operation which is determined by interframe or interfield correlation separately in the sum and difference blocks.

5. An apparatus according to claim 3, wherein orthogonal transformed data in each medium block are allocated in a spatial, time sequence from low frequency data to high frequency data.

6. An apparatus according to claim 5, wherein in allocating the orthogonal transformed data in the medium block in a spatial, time sequence from low frequency to high frequency, the orthogonal transformed data are arranged in an order of a sum block followed by a difference block when the orthogonal transform circuit selects an intraframe orthogonal transforming operation and in an order from a sum of sum block fields to a sum of difference block fields, a difference between difference block fields, and a difference between sum block fields when the orthogonal transform circuit selects an intrafield orthogonal transforming operation.

7. A playback apparatus for reproducing from a recording medium a first digital video signal and a second digital video signal, the second digital video having a wider bandwidth than that of the first digital video signal, comprising:
   a reproducing means for reproducing a recorded data on the recording medium to obtain a playback signal;
   an intraframe expanding means for converting the playback signal into a video signal made up of data frames through an inverse two-dimensional orthogonal transformation; and
   an interframe inverse calculating means for processing every two frames output by the intraframe expanding means to produce a set having a sum frame and a difference frame, the sum frame based on a pixel value sum of the two frames and the difference frame based on a pixel value difference between the two frames;
   wherein, when the recorded data is the first digital video signal, the output of the intraframe expanding means is delivered as an output signal of the playback apparatus, and when the recorded data is the second digital video signal, the output of the interframe inverse calculating means is delivered as the output signal of the playback apparatus.

8. A video signal recording apparatus for selectively recording a first video signal which is a standard TV signal of digital format and a second video signal which is a digitized TV signal having a greater bandwidth than that of the first video signal; comprising:
   an image dividing means for dividing each picture frame of the second video signal into n segments ranging from a first segment data to an n-th segment data, where n is a positive integer;
   first to n-th interframe calculating means for respectively processing every two frames of the first to n-th segment data of the second video signal to produce first to n-th sets, each having a sum frame and a difference frame, the sum frame based on a pixel value sum of the two frames and the difference frame based on a pixel value difference between the two frames;
   a first compressing means for selectively compressing the first set of the sum frame and the difference frame produced by the first interframe calculating means or the first video signal through two-dimensional orthogonal transformation in each frame;
   second to n-th compressing means for respectively compressing the second to n-th sets of the sum frame and difference frame produced by the second to n-th interframe calculating means through two-dimensional orthogonal transformation in each frame; and first to n-th recording means for respectively recording outputs of the first to n-th compressing means onto a recording medium.

9. An apparatus according to claim 8, wherein a sampling frequency of the second video signal is two times greater than the first video signal.

10. An apparatus according to claim 8, wherein the interframe calculation means comprises a block format circuit for dividing each frame of the second video signal into blocks and an interframe calculation circuit for producing a sum block from interframe addition and a difference block from interframe subtraction, and wherein the compressing means comprises an orthogonal transform circuit for orthogonal transforming the sum and difference blocks and an encoding circuit for compressing the data of a plurality of medium blocks, each medium block being made up of one sum block and one difference block, to a given amount of code form.

11. An apparatus according to claim 10, wherein the orthogonal transform circuit performs either an intraframe or intrafield orthogonal transform operation which is determined by interframe or interfield correlation separately in the sum and difference blocks.

12. An apparatus according to claim 10, wherein orthogonal transformed data in each medium block are allocated in a spatial, time sequence from low frequency data to high frequency data.

13. An apparatus according to claim 12, wherein in allocating the orthogonal transformed data in the medium block in a spatial, time sequence from low frequency to high frequency, the orthogonal transformed data are arranged in an order of a sum block followed by a difference block when the orthogonal transform circuit selects an intraframe orthogonal transforming operation and in an order from a sum of sum block fields to a sum of difference block fields, a difference between difference block fields, and a difference between sum block fields when the orthogonal transform circuit selects an intrafield orthogonal transforming operation.

14. A playback apparatus for reproducing from a recording medium a first digital video signal and a second digital video signal, the second digital video signal having a wider bandwidth than that of the first digital video signal, comprising:

first to n-th reproducing means for reproducing a recorded data on the recording medium to respectively obtain n playback signals, where n is a positive integer;

first to n-th intraframe expanding means for respectively converting the n playback signals into n video signals each made up of data frames through an inverse two-dimensional orthogonal transformation;

first to n-th interframe inverse calculating means for respectively processing every two frames of the n video signals output by the first to n-th intraframe expanding means to produce n sets each having a sum frame and a difference frame, the sum frame based on a pixel value sum of the two frames and the difference frame based on a pixel value difference between the two frames; and an image mixing means for combining frame by frame the n sets of the sum frame and the difference frame produced by the first to n-th interframe inverse calculating means to reconstruct the second video signal;

wherein, when the recorded data is the first video signal, the output of the first intraframe expanding means is delivered as an output signal of the playback apparatus, and when the recorded data is a second video signal, an output of the image mixing means is delivered as the output signal of the playback apparatus.

15. A video signal recording apparatus for selectively recording a first video signal which is a standard TV signal of digital format and a second video signal which is a digitized TV signal having a greater bandwidth than that of the first video signal; comprising:

an image dividing means for dividing each picture frame of the second video signal into n segments ranging from a first segment data to an n-th segment data, where n is a positive integer;

first to n-th interframe calculating means for respectively processing every two frames of the first to n-th segment data of the second video signal to produce first to n-th sets each having a sum frame and a difference frame, the sum frame based on a pixel value sum of the two frames and the difference frame based on a pixel value difference between the two frames;

a first compressing means for selectively compressing the first set of the sum frame and the difference frame output by the first interframe calculating means or the first video signal through two-dimensional orthogonal transformation in each frame;

second to n-th compressing means for respectively compressing the second to n-th sets of the sum frame and the difference frame output by the second to n-th interframe calculating means through two-dimensional orthogonal transformation in each frame;

a composition/distribution means for receiving outputs of the first to n-th compressing means and converting said outputs into m sets of recording signals, where m is a positive integer; and first to m-th recording means for respectively recording the m sets of recording signals onto a recording medium.

16. An apparatus according to claim 15, wherein a sampling frequency of the second video signal is more than two times a sampling frequency of the first video signal.

17. An apparatus according to claim 15, wherein the interframe calculation means comprises a block format circuit for dividing each frame of the second video signal into blocks and an interframe calculation circuit for producing a sum block from interframe addition and a difference block from interframe subtraction, and wherein the compressing means comprises an orthogonal transform circuit for orthogonal transforming the sum and difference blocks and an encoding circuit for compressing the data of a plurality of medium blocks, each medium block being made up of one sum block and one difference block, to a given amount of code form.

18. An apparatus according to claim 17, wherein the orthogonal transform circuit performs either an intraframe or intrafield orthogonal transform operation which is determined by interframe or interfield correlation separately in the sum and difference blocks.

19. An apparatus according to claim 17, wherein orthogonal transformed data in each medium block are allocated in a spatial, time sequence from low frequency data to high frequency data.

20. An apparatus according to claim 19, wherein in allocating the orthogonal transformed data in the medium block in a spatial, time sequence from low frequency to high frequency, the orthogonal transformed data are arranged in an order of a sum block followed by a difference block when the orthogonal transform circuit selects an intraframe orthogonal transforming operation and in an order from a sum of sum block fields to a sum of difference block fields, a difference between difference block fields, and a difference between sum block fields when the orthogonal transform circuit selects an intrafield orthogonal transforming operation.

21. A playback apparatus for reproducing from a recording medium a first digital video signal and a second digital video signal, the second digital video signal having a wider bandwidth than that of the first digital video signal, comprising:

first to m-th reproducing means for respectively reproducing m recorded data from the recording medium to obtain m playback signals, where m is a positive integer;

an inverse composition/distribution means for receiving the m playback signals and converting the m playback signals into n outputs of compressed form, where n is a positive integer;

first to n-th intraframe expanding means for respectively converting the n outputs of compressed form from the inverse composition/distribution means on a frame by frame basis to obtain n video signals each made up of data frames through an inverse two-dimensional orthogonal transformation;

first to n-th interframe inverse calculating means for respectively processing every two frames of the n video signals from the first to n-th intraframe expanding means to produce n sets each having a sum frame and a difference frame, the sum frame based on a pixel value sum of the two frames and the difference frame based on a pixel value difference between the two frames; and an image mixing means for combining frame by frame the n sets of the sum frame and the difference frame produced by the first to n-th interframe inverse calculating means to reconstruct the second video signal;

wherein, when the m recorded data are of the first video signal, an output of the first intraframe expanding means is delivered as an output signal of the playback apparatus, and when the m recorded data are of the second video signal, an output of the image mixing means is delivered as the output signal of the playback apparatus.

* * * * *